United States Patent [19]

Gershman et al.

[11] Patent Number: 5,214,525
[45] Date of Patent: May 25, 1993

[54] EXTENDING BANDWIDTH OF OPTICAL EMITTERS USING ACTIVE MATCHING TECHNIQUE

[75] Inventors: Vladimir Gershman; Afshin S. Daryoush, both of Philadelphia; Warren A. Rosen, Hartsville, all of Pa.

[73] Assignee: The United States of America as represented by the Secretary of the Navy, Washington, D.C.

[21] Appl. No.: 759,296

[22] Filed: Sep. 13, 1991

[51] Int. Cl.[5] ............................................. H04B 10/04
[52] U.S. Cl. .................................... 359/180; 359/173; 372/38; 250/214 A
[58] Field of Search ............... 359/180, 188, 173, 161, 359/176, 179; 372/38; 330/277, 306; 250/214 A; 358/186

[56] References Cited

U.S. PATENT DOCUMENTS

| | | | |
|---|---|---|---|
| 4,748,634 | 5/1988 | Hesterman | 372/38 |
| 4,945,542 | 7/1990 | Brothers, Jr. | 372/38 |
| 4,984,292 | 1/1991 | Millen | 455/40 |

Primary Examiner—Edward L. Coles, Sr.
Assistant Examiner—Kinfe-Michael Negash
Attorney, Agent, or Firm—James V. Tura; James B. Bechtel; Susan E. Verona

[57] ABSTRACT

An optical transmitter particularly suited for high frequency applications is disclosed. The optical transmitter successfully operates in harsh environments such as those found in avionic applications. The optical transmitter employs an LED as a light source which cooperates with an active bandpass amplifier to provide a relatively wide bandwidth from about 250 MHz to about at least 1.35 GHz. The bandpass amplifier is selected to have a slope characteristic which is complementary to a roll-off characteristic of the LED and compensates for the high frequency loss of the LED. The slope characteristic of the bandpass amplifier predominates at the high frequencies of the response of the optical transmitter, whereas the frequency response of the LED dominates at the lower frequencies of the response.

17 Claims, 6 Drawing Sheets

EXTENDING BANDWIDTH OF OPTICAL EMITTERS USING ACTIVE MATCHING TECHNIQUE

The invention described herein may be manufactured and used by and for the Government of the United States of America for Governmental purposes without payment of any royalties thereon or therefore.

THE BACKGROUND OF THE INVENTION

The present invention relates to an optical transmitter and, more particularly, to an optical transmitter comprising an optical light source, such as a light emitting diode (LED) or a laser diode (LD), having a predetermined roll-off characteristic that cooperates with a bandpass amplifier having a slope characteristic which is selected to be complementary to the roll-off characteristic of the LED so as to yield a high frequency bandwidth transmitter.

Optical transmitters are finding use in advanced computer architectures, such as those found in avionic applications, that provide the means to transmit a larger amount of data over optical fibers located between processing elements. One of the major obstacles for such transmitters is the speed of the optical source of the transmitter itself. Laser diodes are commonly used to serve as a light source and are capable of high modulation rates, but suffer from well-known temperature problems and, therefore, normally require complex drive, control, and cooling circuitry.

Light emitting diodes (LEDs) also serve as light sources for the transmitter and do not suffer the same temperature restrictions as laser diodes. However, currently available LEDs are limited in their bandwidth capabilities to about several hundred megahertz (MHz). Efforts have been made to increase the bandwidth by increasing the speed of the LED itself. This increase in speed may be realized by decreasing the size of the active region of the LED or by more heavily doping the LED. These methods do improve the optical bandwidth of the LED but limit the amount of optical power that the LED can deliver.

Further efforts involving specialized drive circuits, based on a resistance-capacitive (RC) speed-up technique, have been expended to increase the power delivered by the LED light source. The RC speed-up technique is similar to the arrangements found in flip-flop circuits in which a capacitor is connected in parallel with a cross-coupling resistor both of which cooperate to accelerate the transition of the flip-flop from one stable state to another. While such drive circuits do increase the amount of the deliverable power, the obtainable bandwidth is limited to the hundreds of megahertz range.

High speed optical avionics data links have been constructed from multiple, relatively low speed, LEDs that are arranged in parallel. One such data link employs four LEDs, each operating at a speed of 250 MHz, and each arranged in parallel so that the overall bandwidth of the data link is in the gigahertz frequency range. Such a multiple arrangement involves electronics, in groups of four, at each end of the data link that include multiplexers, encoders, receivers, and clock recovery devices that accommodate the four LEDs. In addition, since the data on each line (related to the respective LED) may not arrive simultaneously (due to different path lengths), such circuit arrangements require buffer devices to store the incoming data for the subsequent use thereof.

Further efforts to increase the speed of optical transmitter are being pursued by the way of the so called "three terminal LEDs." These devices are being developed based on a quantum confined Stark effect and theoretically may achieve very high speeds. However, these LED devices are still in experimental stage and do not now represent a feasible solution for supplying a high speed optical source for an optical transmitter. It is desired that a conventional LED device be used as the optical source of the optical transmitter and provide for a bandwidth of operation in the gigahertz range. It is further desired that other optical emitters, such as a laser diode, serve as the optical source and provide for operation in the gigahertz range.

SUMMARY OF THE INVENTION

The present invention is directed to an optical transmitter comprising an optical light source, such as a light emitting diode (LED) or laser diode (LD) and a bandpass amplifier. The LED or LD serves as the optical source and has a predetermined roll-off characteristic which cooperates with the bandpass amplifier having a slope characteristic that is complementary to the roll-off characteristic.

The optical transmitter has a predetermined bandwidth and provides the path between input and output processing elements with the input element being a signal source and the output element being a user of the data contained within the signals of the source. The light emitting diode or laser diode of the transmitter has the predetermined roll-off characteristic along with a predetermined impedance. The bandpass amplifier has an operating characteristic slope which is complementary to the roll-off characteristic. The transmitter preferably has an input matching network connected to the signal source and output matching network connected to the optical light source. The transmitter provides for wide bandwidth operation and high optical power delivery both by using active matching and filtering techniques. The active matching technique can be used to extend bandwidth of any optical emitter. The active bandpass amplifier, with a slope complementary to that of the roll-off characteristic of the optical light source, compensates for the high frequency loss of the optical light source. The optical light source is in the output stage of the transmitter and is coupled to the output processing element by means of an optical fiber.

The optical transmitter using an LED, in one embodiment, as its light source is particularly suited for advanced computer architectures such as those found avionic applications. The optical transmitter of the present invention successfully operates in the harsh environment of avionic applications and provides a bandwidth in the gigahertz range.

Accordingly, it is an object of the present invention to provide an optical transmitter having a light emitting diode or laser diode as a light source that yields an operating bandwidth in the gigahertz range.

It is a further object to the present invention to provide an optical transmitter using lumped and distributed parameters in such a manner so as to further increase the overall bandwidth of the optical transmitter.

Still further, is an object of the present invention to provide a optical transmitter capable of launching sufficient power into an optical fiber to satisfy the needs of avionic applications.

Other objects, advantages and novel features of the invention will become apparent from the following detailed description of the invention when considered in conjunction with the accompany drawings wherein:

DETAILED DESCRIPTION OF THE PREFERRED EMBODIMENTS

Figure 1:
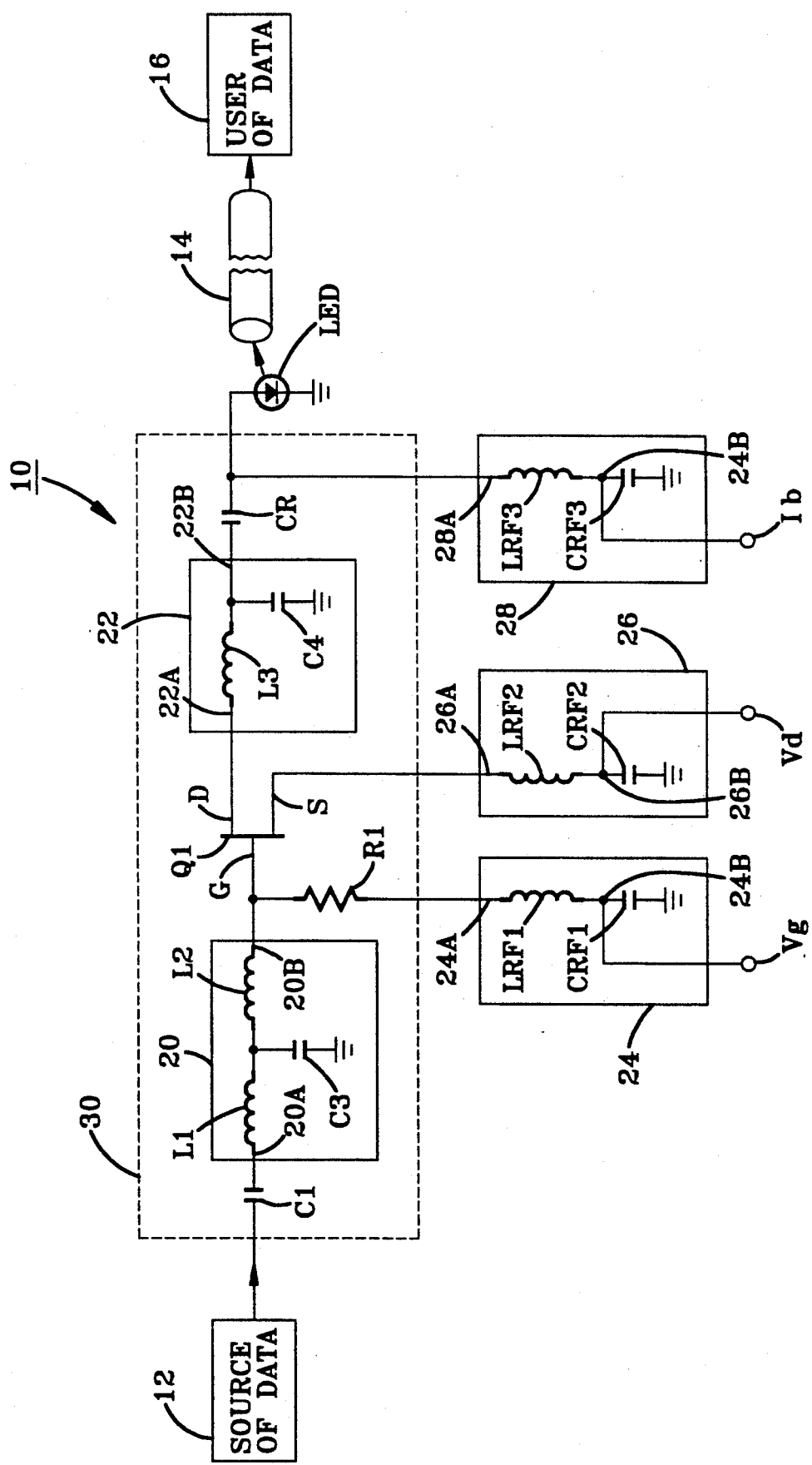
FIG. 1 is a schematic representation of an optical transmitter in accordance with one embodiment of the present invention.

The present invention provides an optical transmitter having an electrical bandwidth that extends from a few hundred megahertz to several gigahertz. The present invention uses active matching techniques to extend the bandwidth of any optical emitter such as a light emitting diode (LED) or laser diode (LD). The optical transmitter comprises a light emitting diode (LED) or a laser diode (LD) as its optical source and serves well in the harsh environment commonly found in avionic applications. A first embodiment of an optical transmitter 10 using a LED is shown in FIG. 1.

The optical transmitter 10 provides the path between input and output processing elements. The input processing element 12 is a source of data which is coupled, by means of the transmitter 10 and an optical fiber 14, to the output processing element 16 which is a user of the data contained within the signals of input element 12. The optical transmitter 10 is comprised of elements each having a function as given in Table 1:

TABLE 1

| Element | Function |
|---|---|
| C1 | Input AC coupling capacitor |
| CR | Output AC coupling capacitor |
| 20 | Input matching network |
| 22 | Output matching network |
| 24 | RF Choke 1 |
| 26 | RF Choke 2 |
| 28 | RF Choke 3 |
| R1 | Resistor |
| Q1 | Bandpass amplifier |
| LED | Optical light source |

The capacitor C1 and CR, the network 20 and 22, the transistor Q1, and the resistive element R1 may all be formed on a chip 30 by using monolithic microwave integrated circuit (MMIC) technology. This MMIC chip 30, as shown in FIG. 1, provides the interconnecting path between the source of data 12 and the LED.

The input matching network 20 has an input terminal 20A and an output terminal 20B. The network 20 is preferably arranged as a T-type filter and comprises a first inductive element L1, a second inductive element L2, and a third capacitive element C3. The input terminal 20A is connected to one end of C1 which, in turn, has its other end connected to the source of data 12. The output terminal 20B is connected to both one side of the resistor R1 and to the gate electrode of the transistor device Q1. The network 20 is selected to have values so as to match the input impedance of Q1 to the output impedance of source 12 typically having a value of about 50 ohms.

The output matching network 22 has an input terminal 22A and output terminal 22B. The network 22 is preferably arranged as a L-type filter and comprises a third inductive element L3 and a fourth capacitive element C4. The input terminal 22A is connected to the source electrode of the transistor Q1, and the output terminal 22B is connected to one end of the capacitor element CR which, in turn, has its other end connected to the anode of the LED. The network 22 is selected to have values to match, in a conjugately manner, the output impedance of Q1 to the input impedance of the LED. The output of the LED is preferably butt coupled to an optical cable 14 which may be a 50/125 micro meter Siecor fiber. The fiber 14 may also be of a 100/140 micro meter type.

The first RF Choke 24 has an input terminal 24A and an output terminal 24B. The input terminal 24A is connected to one end of resistor R1 which, in turn, has its other end connected the gate electrode of transistor Q1. The output terminal 24B is connected to the source of voltage $V_g$ supplying the transistor Q1. The RF choke 24 is comprised of serial arrangement of a first RF inductive element LRF1 and a first RF capacitive element CRF1 which has one of its ends connected to a ground potential. The RF choke 24, as well as RF Chokes 26 and 28, operate in a well-known manner so as to isolate the respective sources ($V_g$, $V_d$, and $I_b$) from the high frequency signals handled by chip 30.

The second RF choke 26 has an input terminal 26A and an output terminal 26B. The choke 26 is comprised of a second RF inductive element LRF2 and a second RF capacitive element CRF2. The elements LRF2 and CRF2 are serially arranged, as shown in FIG. 1, with one end of CRF2 being connected to ground. The input terminal 26A is connected to the drain electrode of transistor Q1 and the output terminal 26B is connected to the source voltage ($V_d$) of the drain electrode of Q1.

The third RF choke 28 has an input terminal 28A and an output terminal 28B. The input terminal 28A is connected to anode of the LED and output terminal 28B is connected to a source of current ($I_b$) used in the operation of the LED. The RF choke 28 is comprised of a serial arrangement of a third RF inductive element LRF3 and a third RF capacitive element CRF3.

The transistor Q1 and the LED are standard and off-the-shelf devices. The transistor Q1 is preferably a field-effect type comprised of gallium arsenide. During the operation the field-effect transistor is preferred that it have a drain to source current of about 48 mA. The LED may be InGaAsP/InP type LED commercially available from NEC (NEC-NDL5314). The LED is preferably inherently fast and has typical rise and fall times of 0.8 ns to 1.5 ns respectively. For its operation, it is preferred that the LED be prebiased at about 25 mA.

It is an important feature of the optical transmitter 10 for the LED to have a predetermined roll-off characteristics. Further, the operation of the bandpass amplifier, primarily comprised of Q1, is selected to have a slope characteristics which is complementary to the roll-off characteristics of the LED.

The present invention uses active matching techniques to extend bandwidth of any optical emitter. The optical emitter may be a light emitting diode (LED) or a laser diode (LD). The concept of active matching can be visualized as cascading the wideband amplifier, such as Q1 of FIG. 1, with the optical emitter where the gain slope of the amplifier is complementary to the gain slope of the optical emitter.

The operation of the bandpass amplifier Q1, with its complementary slope, predominates at the upper frequencies of the response of the optical transmitter, whereas the frequency response of the optical emitter LED of FIG. 1 predominates and controls the frequency response of the optical transmitter at the lower frequencies. The cooperative effect is to provide an optical transmitter 10, efficiently using an LED light source, having a frequency response from about 250 megahertz (MHz) to about at least 2.3 gigahertz (GHz). The overall performance of the optical transmitter 10 may be further described with reference to FIG. 2.

Figure 2:
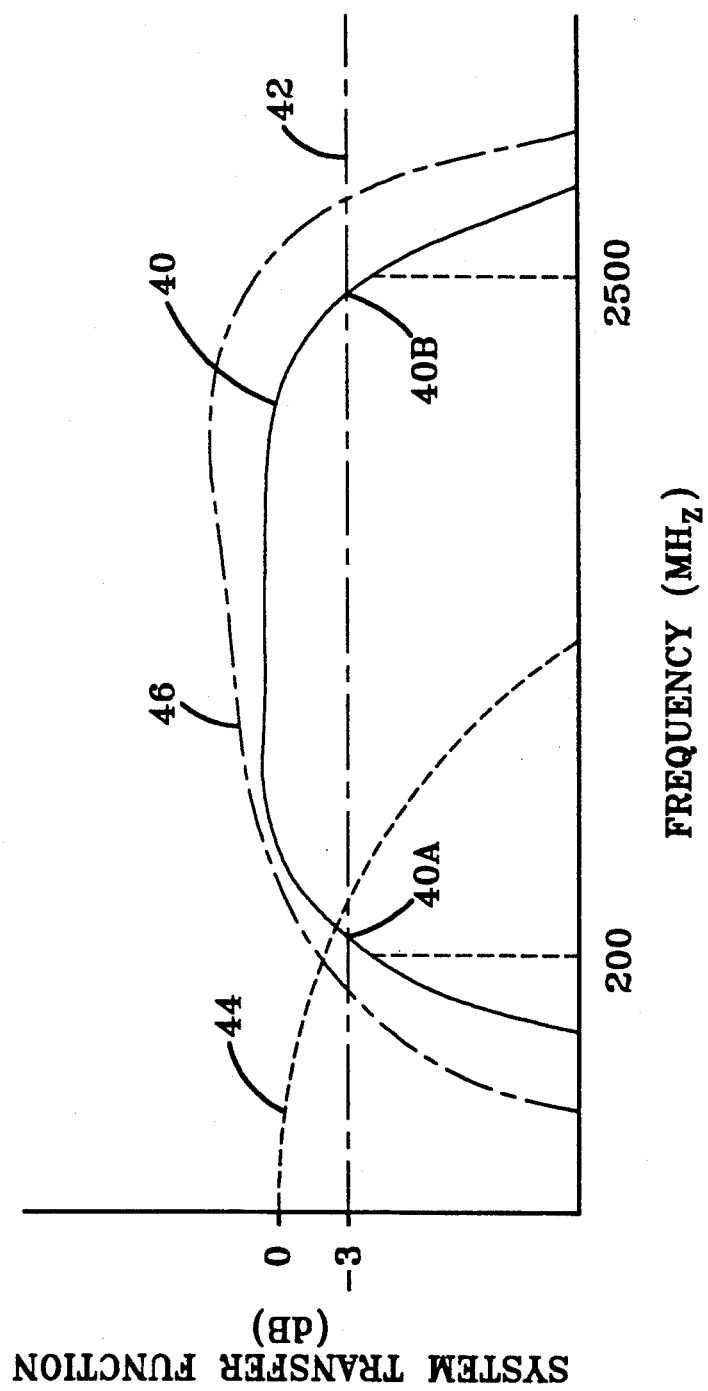
FIG. 2 illustrates the characteristic curves interrelated to the overall frequency response of the embodiment of FIG. 1.

FIG. 2 is a conceptual representation of the active matching technique of the present invention. FIG. 2 illustrates a plot 40 which is associated in a general manner, with an LED optical emitter. Performance details of an LED optical emitter are to be discussed hereinafter, e.g., with reference to FIG. 6. The plot 40 of FIG. 2 is illustrated in terms of the system transfer function (Y axis), given in dB, versus, frequency (X axis), given in megahertz (MHz). The electrical bandwidth, measured in terms of its three (3) dB points is indicated in FIG. 2 by means of a reference line 42.

The plot 40 is a composite derived from the combination of the LED response 44 and the bandpass amplifier response 46 both shown in FIG. 2. The LED response 44 predominates at the low end of response 40, whereas, the bandpass amplifier response 46 predominates at the high end of response 40. From FIG. 2 it is seen that the LED response 44 substantially starts its decay at about 200 MHz. Conversely, the bandpass characteristic 46 is selected to have a complementary slope which intercepts the response plot 44 at about 200 MHz and continues therefrom in an increasing manner, for increasing frequencies, so as to provide an overall bandwidth as shown for plot 40. The obtainment of the overall performance shown by plot 40 is accomplished, in part, by first determining the characteristics of the LED which may be described with reference to FIG. 3.

Figure 3:
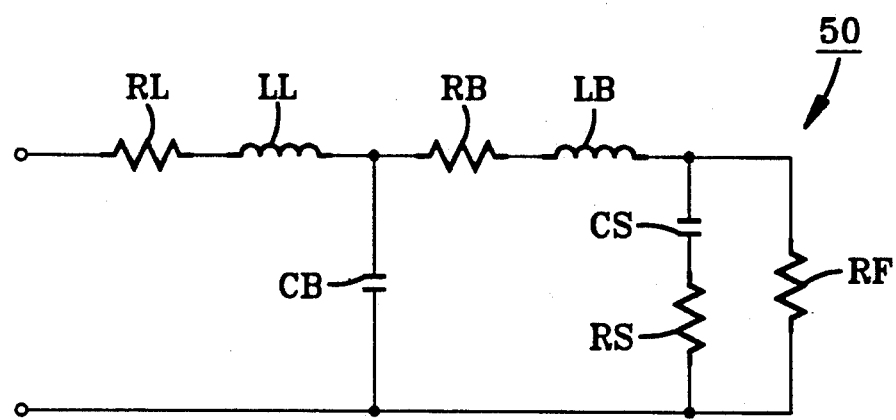
FIG. 3 illustrates an equivalent circuit of the LED of FIG. 1.

FIG. 3 shows an equivalent circuit model 50 of a LED type NECNDL-5314 of NEC previously mentioned with reference with FIG. 1. The equivalent model 50 is comprised of various elements shown in FIG. 3 and have typical values as given in Table 2.

TABLE 2

| Elements | Value |
|---|---|
| RL | 2.54 ohms |
| LL | 2.46 nH |
| RB | 0.99 ohms |
| LB | 0.53 nH |
| CB | 1.12 pF |
| CS | 0.73 pF |
| RS | 0.99 ohms |

TABLE 2-continued

| Elements | Value |
|---|---|
| RF | 7.9 ohms |

The model 50 was obtained by mounting the LED in a test fixture and then determining its performance characteristic in terms of its 3 dB electrical bandwidth and its return loss. The return loss is herein termed $\Gamma_L$. The equivalent circuit model 50 is based on a measurement of the return loss $\Gamma_L$, and the identification of the parasitics of the LED. The return loss was measured using the TRL technique, such as that described in Hewlett-Packard Product Note 8510-8, entitled, "Applying the 8510B TRL Calibration for Non-Coaxial Measurements," published in Aug. 1987. The 3 dB electrical bandwidth of the LED was measured using a high speed Tektronix lightwave converter and it was found to be about 250 MHz.

When the equivalent circuit 50 is treated as two-port network with $S_{21}$ characterizing the LED's optical forward gain, the frequency response of the LED may be simulated on a computer. The equivalent circuit may than be modified to take into account the dynamic response of the LED. Any reduction in the frequency response of the LED at high frequencies, due to electron recombination lifetime, may be modeled as a frequency dependent forward resistance characteristic.

Figure 4:
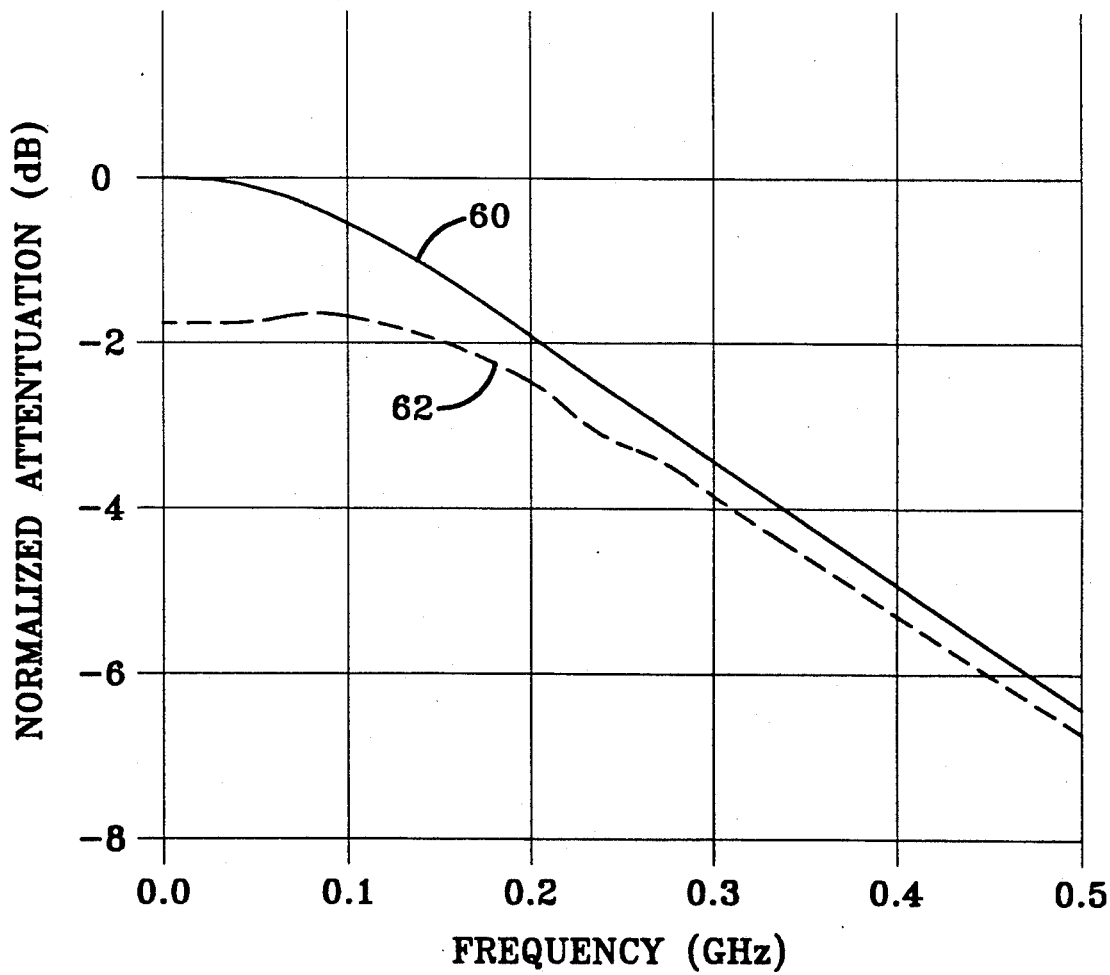
FIG. 4 illustrates the predicted frequency responses of the LED of FIG. 1 with and without RC speed-up techniques.

In order to compare the benefits of the active matching techniques of the present invention, having a response shown in FIG. 2, against the commonly used RC speed-up method, such as described in the "Background" section, a frequency response of the equivalent circuit model 50 of FIG. 3 was simulated in conjunction with an RC speed-up network. The frequency response of the model 50 is shown in FIG. 4 as plot 60, whereas the response of the RC speed-up network is shown as plot 62. The effect of the RC speedup circuit (plot 62) on the LED bandwidth is shown in FIG. 4, wherein the bandwidth is increased at the expense of decreased power at lower frequencies. This may be seen by noting that the plot 62 drops from its maximum value to a value of about 0.707 of its maximum value in a less rapid manner relative to that of plot 60. The bandwidth improvement of the RC speed-up network is about a 3 dB bandwidth of about 400 MHz. For the applications contemplated by the present invention, the reduction in the deliverable power of the RC speed-up network disadvantageously overrides the benefits yielded by the increased bandwidth.

The optical transmitter 10 of FIG. 1, not having any RC speed-up features, was fabricated and performance testing of it was accomplished. To determine the overall performance of the optical transmitter having the MMIC chip 30, the electrical performance was first measured in at 50 ohms system, that is, a 50 ohm output impedance was present at the source of data 12. The electrical performance of such a system is illustrated in FIG. 5.

Figure 5:
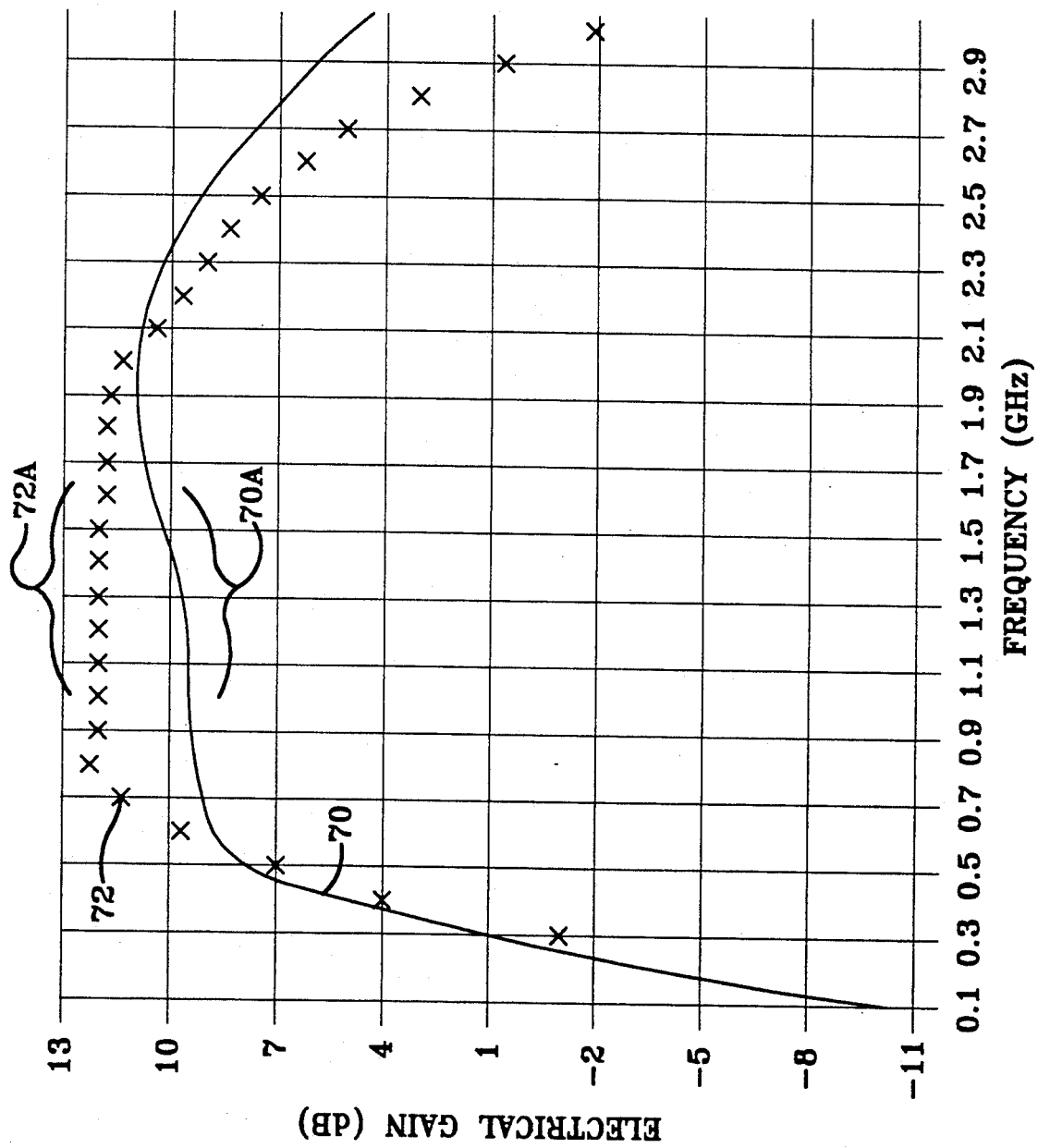
FIG. 5 illustrates responses of the predicted and measured electrical gains of the optical transmitter of FIG. 1.

FIG. 5 illustrates the electrical gain (Y axis), given in dB, versus frequency (X axis) given in gigahertz (GHz). FIG. 5 shows two plots; (1) plot 70 representative of a predicted gain of the optical transmitter 10; and (2) plot 72 shown by an array of X symbols and representative of the measured gain of optical transmitter 10.

From FIG. 5 it is seen that the measured gain 72, more particularly, the portion 72A indicates a relatively flat response of ±200 ps over a bandwidth from about 0.55 GHz to about 2.3 GHz, whereas the corresponding predicted plot 70A illustrates a variable increasing response. This discrepancy, between the predicted and the measured gains, may be contributed to the limitation inherent in the MMIC process for forming chip 30. Such a limitation does not detract from the inventive features of the present invention.

To further determine the characteristics of the optical transmitter FIG. 1, additional tests were performed. One such test positioned the LED in a butt coupled relationship with a 50/125 micro meter Siecor fiber. The output from the fiber was connected to a HP 11982A lightwave converter which was used as an optical receiver. This output signal was then measured with a Tektronix 2756P spectrum analyzer. To achieve a desired performance, the LED was prebiased to 25 mA and the transistor device Q1 was operated at a drain-to-source current of 48 mA. The optical transmitter 10, more particularly, the MMIC chip 30 was modulated with a carrier wave (CW) source from 100 MHz to 2 GHz in steps of 50 MHz, and the resulting optical signals, yielded from the LED, were detected by the Hewlett Packard (HP) lightwave converter and measured on a spectrum analyzer. The measured and predicted results related to such testing are shown in FIG. 6.

Figure 6:
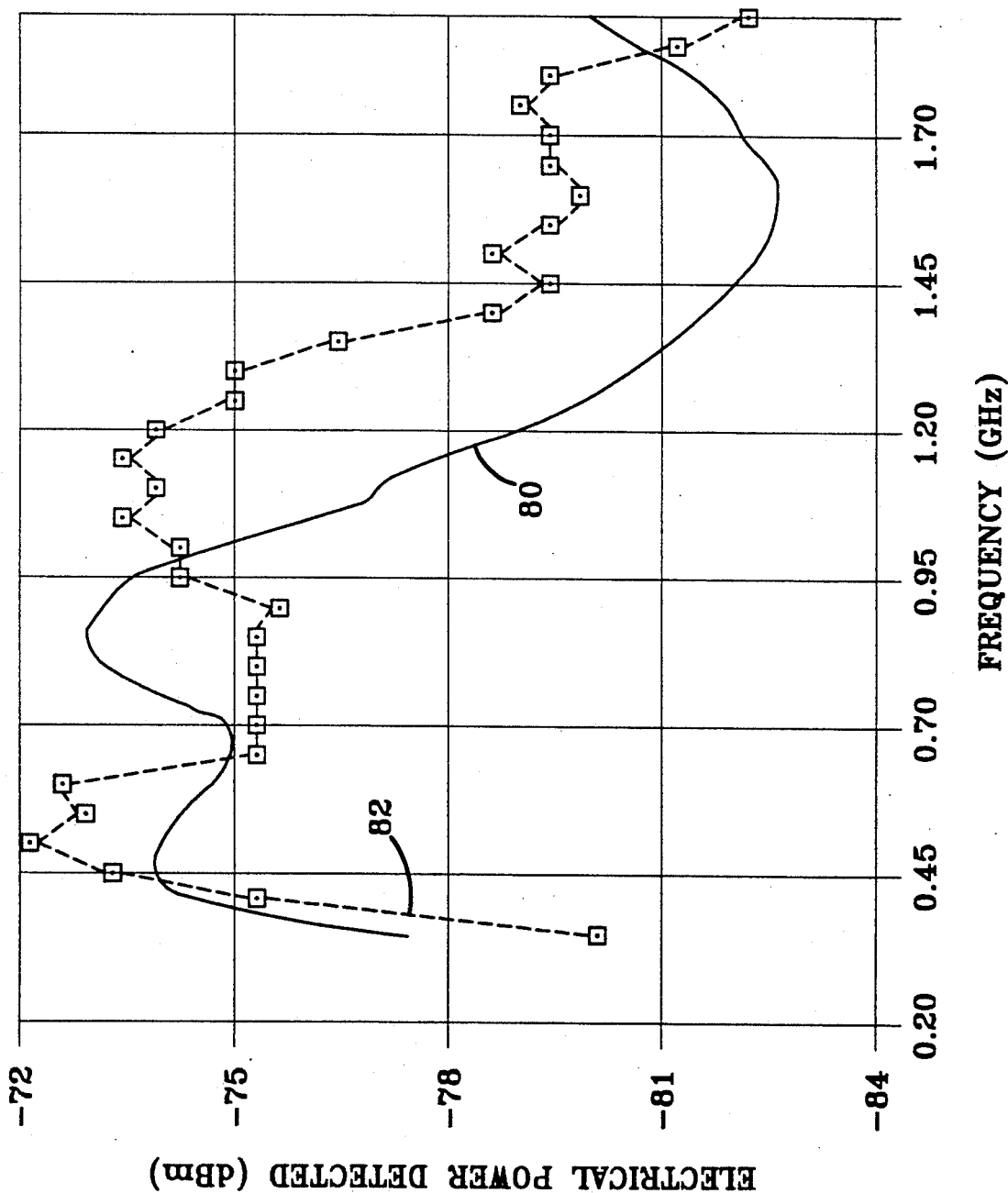
FIG. 6 illustrates predicted and measured frequency responses of the optical transmitter of FIG. 1.

FIG. 6 shows two plots 80 and 82 of electrical power detected (Y axis), given in dBm, versus frequency (X axis) given in gigahertz (GHz). The first plot 80 is the predicted frequency response of the optical transmitter 10, and the second plot is the measured frequency response of the optical transmitter 10. From FIG. 6 it is seen, that the 3 dB electrical bandwidth of the measured frequency response 82 extends from about 400 MHz to about 1.35 GHz, which corresponds to an optical bandwidth of about 35 0 MHz to about 1.8 GHz. The gain variation over this bandwidth is approximately ±1.5 dBm. The shape of the measured frequency response 82 follows the shape of the predicted frequency response 80 except that the measured curve 82 is shifted to the right, relative to plot 80, as shown in FIG. 6. This shifting may be contributed to the fact that the LED model 50 of FIG. 3 of the LED responsivity was assumed to be a constant, whereas in reality it is a function of the frequency because the average RF current, flowing in the transmitter 10, provides the operating point of the LED. This variable operating point also contributes to causing the bandwidth of the predicted frequency response 80 to be somewhat narrower than the measured frequency response 82. It is believed that these differences may also be contributed to the MMIC limitations in forming the MMIC chip 30. The measured bandwidth of the MMIC chip 30 of FIG. 1 fabricated for the performance testing described herein, is somewhat smaller than the predicted bandwidth and its 6 dB/octave slope characteristic is somewhat limited.

The optical transmitter 10 having a response of FIG. 6 was further tested and initially −22 dBm of optical power was detected at its output stage as it entered into a 50/125 micro meter optical fiber. This relatively low power was because the LED of FIG. 1 was separated from the end of the fiber by a relatively large and undesired amount. This amount was removed and 100/140 micro meter optical fiber was used instead of the 50/125 micro meter optical fiber. The replacement fiber was butted directly against the LED resulting in a very satisfactory power output of −13 dBm. It should also be noted, that even higher optical power (greater than −13 dBm) can be achieved by increasing the LED drive current. For the testing described hereinbefore, a maximum drive current of only 60 mA was used. The drive current limitation is primarily contributed to because of the type of FE device used in the testing.

It should now be appreciated that the practice of the present invention provides an optical transmitter using an LED as a light source and having an optical bandwidth from about 350 MHz to about 1.8 GHz. Further, it should be appreciated that the transmitter may typically launch −13 dBm of optical power into a typical optical fiber of 100/140 micro meter.

Figure 7:
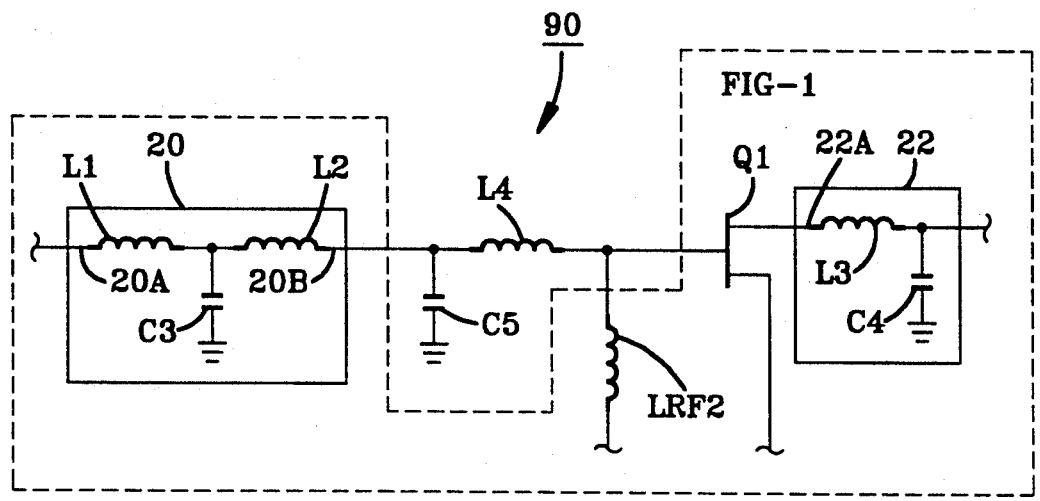
FIG. 7 is a schematic illustrating the primary elements of a second embodiment of the present invention that uses lumped and distributed components.

A second embodiment of the present invention, shown in FIG. 7, uses lumped components and has a predicted optical bandwidth from 100 MHz to 2.5 GHz with a gain ripple of ±0.5 dB. FIG. 7 shows a circuit arrangement 90 similar to the circuit arrangement 10 of FIG. 1 with the exception that the resistor, R1 of FIG. 1, is replaced by a parallel arrangement of a fourth inductive element L4 and a fifth capacitive element C5. FIG. 7 also shows the input (20) and output (22) matching networks. The other components of circuit arrangement 90 of FIG. 7 are the same as those of the circuit arrangement 10 but are not shown for the sake of clarity. One end of each of the elements L4 and C5 is connected to the inductive element L2. The other side of capacitive element C5 is connected to the ground potential, whereas the other side of the inductive element L4 is connected to both the gate electrode of transistor Q1 and the second RF choke element LRF2. The predicted performance of the circuit arrangement 90 may be described with reference to FIG. 8.

Figure 8:
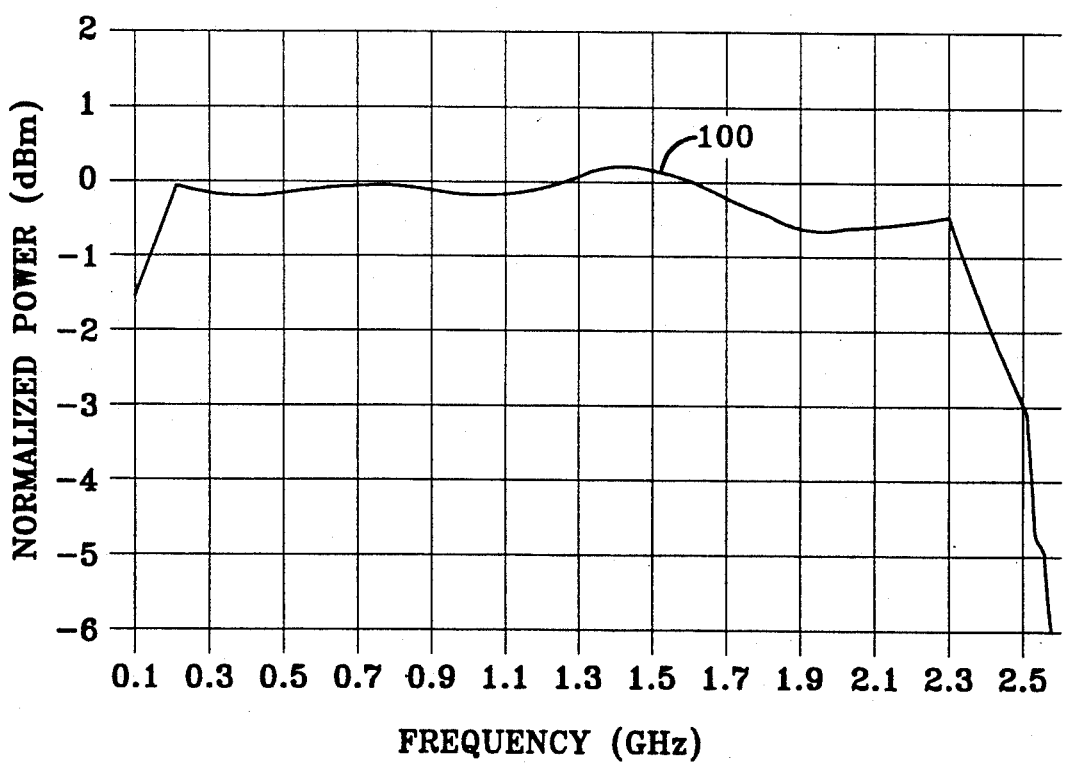
FIG. 8 is a predicted frequency response of the embodiment shown in FIG. 7.

FIG. 8 is a frequency response 100 shown in terms of normalized power (Y axis), given in dBm, versus frequency (X axis) given in gigahertz (GHz). The frequency response 100 is a result of a computer simulation. The predicted bandwidth of response 100 is shown in FIG. 8 as being from about 100 MHz to about 2.5 GHz, and has a predicted power output of −10 dBm.

It should now be appreciated that the practice of the present invention provides various embodiments of optical transmitters each having a LED as a light source and each having a predicted bandwidth well above the prior art limitation of less than one (1) gigahertz.

Although the previously described embodiments utilized a LED as a light source, it should be recognized that other light sources such as a laser diode (LD) are contemplated by the practice of the present invention. The laser diode or other optical emitting devices may be selected as the light source in accordance with the procedure of the active matching technique of the present invention.

The procedure for using the technique is the same for a LED or LD optical emitter. An optical emitter be it an LED or an LD with inherently high optical power and short rise time is first selected. The emitter's return loss and 3 dB bandwidth are then measured using a standard vector network analyzer. Also the emitter's frequency response roll-off is determined (typical 6 dB/octave) from bandwidth measurements.

An equivalent circuit model of the optical emitter is then designed using return loss measurements. The nature of the parasitics is determined from the physical structure of the optical emitter as well as from the shape of the return loss parameter plotted on a Smith chart. A wideband amplifier with a frequency response slope complementary to that of the optical emitter is next designed. The return loss of the optical emitter is used as a load to which the bandpass amplifier's output is conjugately matched over a wide bandwidth. The optimization criteria include 6 dB/octave slope of the amplifier gain and minimization of the mismatch between input and output of the amplifier. The optimization is achieved by varying the values of the elements of the matching networks (20 and 22) in the amplifier.

The forward optical gain of the transmitter consisting of the optical emitter and the wideband amplifier is then optimized. The optimization criteria include maximum forward optical gain, small ripple, and small group delay. The optimization is again achieved by varying the values of the elements of the matching networks in the wideband amplifier. The necessary design is performed using standard microwave CAD software.

The design of the high speed optical transmitter 10 of FIG. 1 using the active matching technique has been implemented sing a microwave monolithic integrated circuit (MMIC) technology to build the wideband amplifier and 1300 nm LED from NEC as the optical emitter. Further effort is currently under way to utilize a high power 850 nm LED, available from General Electric (GE), with the existing MMIC wideband amplifier as well as designing an improved version of the actively matched LED driver using lumped components. The GE LED has the optical and electrical characteristics similar to those of NEC LED except they provide a higher optical output power than the NEC LEDs.

Many modifications and variations of the present invention a possible in view of the above disclosure. It is therefore to be understood, that within the scope of the appended claims, the invention may be practiced otherwise than specifically described.

What we claim is:

1. An optical transmitter comprising;
   (a) an optical emitter having a roll-off characteristic; and
   (b) an active bandpass amplifier cascaded with said optical emitter and being operated to activate said optical emitter, said bandpass amplifier having an operating slope characteristic which is complementary to said roll-off characteristic.

2. An optical transmitter according to claim 1, wherein said optical emitter is a light emitting diode (LED).

3. An optical transmitter according to claim 1, wherein said optical emitter is a laser diode (LD).

4. An optical transmitter with a predetermined bandwidth having an upper frequency in excess of one (1) gigahertz and providing a path between input and output processing elements with the input element being a source of data and the output element being a user of said data, said output element being coupled to the transmitter by an optical fiber, said transmitter comprising;
   (a) a laser diode (LD) located at the output stage of said transmitter and having a predetermined roll-off characteristic and a predetermined input impedance, said LD generating an optical signal which is directed into said optical fiber; and
   (b) an active bandpass amplifier located at the input stage of said transmitter and being responsive to said source of data, said bandpass amplifier being operated to activate said LD in response to said source of data, said bandpass amplifier having an operating slope characteristic which is complementary to said roll-off characteristic.

5. An optical transmitter with a predetermined bandwidth having an upper frequency in excess of one (1) gigahertz and providing a path between input and output processing elements with the input element being a source of data and the output element being a user of said data, said output element being coupled to the transmitter by an optical fiber, said transmitter comprising;
   (a) a light emitting diode (LED) located at the output stage of said transmitter and having a predetermined roll-off characteristic and a predetermine input impedance, said LED generating an optical signal which is directed into said optical fiber; and
   (b) an active bandpass amplifier located at the input stage of said transmitter and being responsive to said source of data, said bandpass amplifier being operated to activate said LED in response to said source of data, said bandpass amplifier having an operating slope characteristic which is complementary to said roll-off characteristic.
   whereby the operation of said LED is selected to dominate the lower end, less than 200 MHz, of the predetermined bandwidth and the operation of said bandpass amplifier is selected to dominate the bandwidth at frequencies greater than 200 MHz.

6. An optical transmitter according to claim 5, wherein said predetermined roll-off characteristic starts to substantially decay at 200 MHz and said complementary slope characteristic substantially matches said roll-off characteristic at said 200 MHz, and continues therefrom in an increasing manner for increasing frequencies so that an overall 3 dB bandwidth is provided from 250 MHz to about at least 1.35 GHz.

7. An optical transmitter according to claim 5, wherein said bandpass amplifier comprises a field-effect transistor comprised of gallium arsenide.

8. An optical transmitter according to claim 5, wherein said LED is of a material comprising InGaAsP/InP and has rise and fall times of 0.8 ns and 1.5 ns respectively.

9. An optical transmitter according to claim 5, wherein said LE is a 850 nm type.

10. An optical transmitter according claim 9, wherein the predetermined roll-off characteristic of said LED substantially starts its decay at about 200 MHz and said complementary slope characteristic of said transistor device substantially matches said roll-off characteristic at 200 MHz, and continues to increase therefrom for increasing frequencies so as to provide an overall 3 dB bandwidth for the optical transmitter from 250 MHz to 2.5 GHz.

11. An optical transmitter providing a path between a source of data with a predetermined output impedance and a user of said data, said optical transmitter having a predetermined frequency bandwidth with an upper frequency in excess of one (1) gigahertz comprising:
   (a) a light emitting diode (LED) at the output stage of the transmitter and having a predetermined roll-off characteristic and a predetermined input impedance;
   (b) an AC input coupling capacitive element located at the input stage of the transmitter and having one end connected to said source of data;
   (c) an AC output capacitive element having one end connected to said LED;

(d) an input matching network arranged as a T-type filter and having an input terminal and an output terminal, said input matching network comprised of a first inductive element L1, a second inductive element L2, and a third capacitive element C3, said input terminal connected to the other end of said AC input coupling capacitive element, said input matching network selected to have values so as present an impedance at said input terminal which substantially matches said output impedance of said source of data;

(e) a first resistive element R1 having one end connected to the output terminal of said input matching network;

(f) a first RF choke comprised of a first RF inductive element LRF1 and a first RF capacitive element CRF1, said LRF1 and CRF1 elements being arranged in series with one end of CRF1 being connected to a ground potential, said first RF inductive element LRF1 having one end connected to the other end of the first resistive element R1 and its other end connected to a source of gate voltage ($V_9$);

(g) a transistor element Q1 having a characteristic slope which is complementary to said roll-off characteristic of said LED, said transistor having gate, drain, and source electrodes with the gate electrode being connected to the output terminal of said input matching network;

(h) a second RF choke having an input terminal and an output terminal, said second RF choke comprised of a serial arrangement of a second RF inductive element LRF2 and a second RF capacitive element CRF2 which has one end connected to a ground potential, said input terminal connected to the drain electrode of said transistor element and to one end of said element LRF2, said output terminal connected to the other end of said element LRF2 and to the source of voltage of said drain electrode ($V_d$);

(i) an output matching network arranged as a LC-type filter and comprised of a third inductive element L3 and a fourth capacitive element C4, said output matching network having an input terminal connected to said source electrode and an output terminal connected to the other end of said AC output capacitive element, said output matching network having values selected so as to match the impedance at the output of said transistor element to the input impedance of said LED; and (j) a third RF choke comprised of a serial arranged third RF inductive element LRF3 and a third RF capacitive element CRF3 which has one end connected to a ground potential, said third RF choke having an input terminal connected to the other end of said LRF3 element and to the LED, said third RF choke having an output terminal connected to a source of current ($I_b$).

12. An optical transmitter according to claim 11, wherein said input matching network is selected to have values so as to match the input impedance of said transistor device to a value of 50 ohms.

13. An optical transmitter according to claim 13 wherein said output matching element is selected to have values to conjugately match the impedance at the output of the transistor element to the input impedance of said LED.

14. An optical transmitter according to claim 11 wherein the predetermined roll-off characteristic of said LED substantially starts its decay at 200 MHz and said complementary slope characteristic of said bandpass amplifier substantially matches said roll-off characteristic at 200 MHz, and continues to increase therefrom for increasing frequencies so as to provide a bandwidth for said optical transmitter from 250 MHz to about 1.35 GHz.

15. An optical transmitter providing a path between a source of data with a predetermined output impedance and a user of said data, said optical transmitter having a predetermined bandwidth with an upper frequency in excess of one (1) gigahertz comprising:

(a) a light emitting diode (LED) at the output stage of the transmitter and having a predetermined roll-off characteristic and a predetermined input impedance;

(b) an AC input coupling capacitive element located at the input stage of the transmitter and having one end connected to said source of data;

(c) an AC output coupling capacitive element having one end connected to said LED;

(d) an input matching network arranged as a T-type filter and having an input and an output terminal, said input network comprised of a first inductive element L1, a second inductive element L2, and a third capacitive element C3 which has one end connected to a ground potential, said input terminal connected to the other side of said AC input coupling capacitive element, said input matching network selected to have values so as present an impedance at said input terminal which matches said output impedance of said source of data;

(e) a parallel arrangement of a fifth capacitor element and a forth inductive element, said elements L4 and C5 having one end connected to each other which, in turn, is connected to said output terminal of said input matching network, said other end of said capacitive element C5 being connected to a ground potential;

(f) a first RF choke comprised of a serial arranged RF inductive element LRF1 and a first RF capacitive element CRFI which has one end connected to a ground potential, said first RF inductive element LRF1 having one end connected to the other side of said forth inductive element L4 and its other end connected to a source of gate voltage ($V_g$);

(g) a transistor device having a characteristic slope which is complementary to said roll-off characteristic of said LED, said transistor device having gate, drain, and source electrodes with the gate electrode being connected to the output terminal of said input matching network;

(h) a second RF choke having an input terminal and an output terminal, said second RF choke comprised of a serial arrangement of a second RF inductive element LRF2 and a second RF capacitive element CRF2 which has one end connected to a ground potential, said input terminal connected to the drain electrode of said transistor element and to one end of said element LRF2, said output terminal connected to the other end of said element LRF2 and to a source of drain voltage (Vd);

(i) an output matching network arranged as a L-type filter and comprised of a third inductive element L3 and a fourth capacitive element C4, said output matching network having an input terminal connected to said source electrode and an output terminal connected to the other end of said AC output capacitive element, said output matching network having values selected so as to match the impedance at the output of said transistor device to the input impedance of said LED; and (j) a third RF choke comprised of a third RF inductive element LRF3 and a third RF capacitive element CRF3 which has one end connected to a ground potential, said third RF choke having an input terminal connected to the other end of said LRF3 element and to said LED, said third RF choke having an output terminal connected to a source of current ($I_b$).

16. An optical transmitter according to claim 15, wherein said input matching network is selected to have values so as to match the input impedance of said transistor device to a value of 50 ohms.

17. An optical transmitter according to claim 15, wherein said output matching network is selected to have values to conjugately match the impedance at the output of the transistor device to the input impedance of said LED.

* * * * *